2 Sheets—Sheet 1.
J. W. BARTLETT.
Sewing Machine.
No. 2,210.
Reissued March 27, 1866.
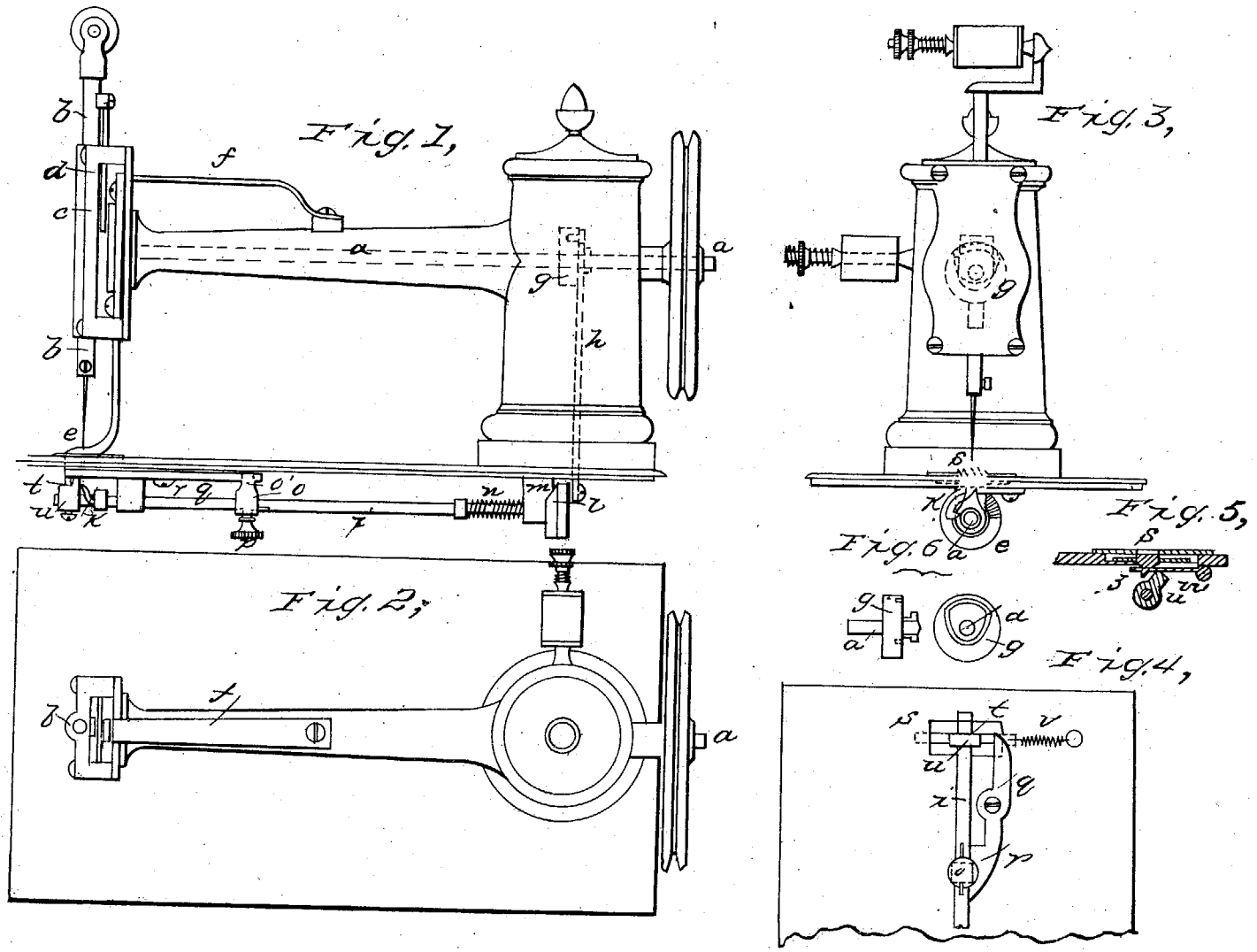
N. PETERS, Photo-Lithographer, Washington, D. C.

2 Sheets—Sheet 2.
J. W. BARTLETT.
Sewing Machine.
No. 2,210.
Reissued March 27, 1866.
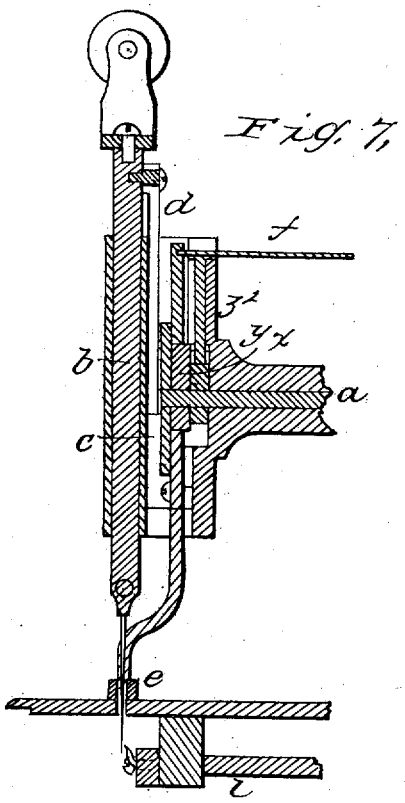
J. N. Stifford
F. Mant
J. W. Bartlett
Improved Sewing Machine
N. PETERS, Photo-Lithographer, Washington, D. C.

UNITED STATES PATENT OFFICE.

JOSEPH W. BARTLETT, OF NEW YORK, N. Y.

IMPROVEMENT IN SEWING-MACHINES.

Specification forming part of Letters Patent No. 46,064, dated January 31, 1865; Reissue No. 2,210, dated March 27, 1866.

*To all whom it may concern:*

Be it known that I, JOSEPH W. BARTLETT, of the city, county, and State of New York, have invented a new and useful method of feeding the material to be sewed and forming the seam in machines for sewing; and I do hereby declare that the following specification, taken in connection with the drawings, is a full, clear, and exact description thereof.

Figure 1 is a side elevation of the machine; Fig. 2, a plan; Fig. 3, an end elevation; Fig. 4, a plan of the feeding mechanism; Fig. 5, a section thereof applicable to single-loop machines, the feed-bar having its upward and forward motions from the same cam, its backward motion being derived from a spring or other well-known means; Fig. 6, a side and end elevation of cam *g;* Fig. 7, a section showing the feeding mechanism applied above the table.

The same letters apply or refer to the same parts in all the figures.

Prior to the date of my invention various devices have been employed to raise and advance the feeding-bar; and the nature of the first part of my invention consists in arranging in single-loop machines a more simple, directly-acting, and positive mechanism than has been used before in that class of machines; and the nature of the second part of my invention, which is applicable to machines which make what is known as the "Grover & Baker" or "double loop" stitch, consists in the means for giving a longitudinal reciprocating motion to the shaft, whereby the loop is spread, in addition to the usual rocking motion.

*a* represents the main shaft; *b*, the needle-rod; *c*, the crank-pin; *d*, the connecting-rod; *e*, the presser-foot; *f*, its spring; *g*, the cam on the main shaft; *h*, a connecting-rod from driving-shaft *a* to rocking shaft *i; k*, the looper; *l*, a side or face cam secured to and moving with the rocking shaft; *m*, a bearing against which cam *l* acts; *n*, the return-spring; *o*, an adjustable sleeve upon shaft *a; p*, the screw that holds it; *q*, a lever that moves the feed-bar; *t*, a pin thereon; *u*, the feed-cam; *v*, the feed-bar return-spring.

It will be observed that to secure the ends contemplated by the first part of my invention only a portion of the parts referred to are necessary. I will therefore first describe their operation.

Turn-shaft *a* and cam *g* thereon, by its connecting-rod *h*, causes rod *i* to rock slightly upon its bearings, which brings cam *u* against the under side of feed-bar *s* and elevates it, and then, striking against projection *z*, forces it forward, as seen in Fig. 5. Bar *w* (which may be used or not, at the option of the manufacturer) is designed to relieve the bar *s* from the friction of cam *u*, striking directly upon it. As feed-bar *s* advances spring *v* is extended, rod *i*, turning backward upon its bearings by the action of cam *g*, relieves the pressure of cam *u* against projection *z* and feed-bar *s*, which consequently drops, and the spring draws it back to its original position.

It is to be understood that when a single-thread stitch is made, as above, the looping-hook is so placed upon the shaft as to point in a different direction opposite that shown in Fig. 3, in which a thread-carrying looper for making the double-looped stitch with two threads is shown.

The movements different from and additional to the foregoing, which come into play when a double-loop seam is made, are as follows: As rod *i* turns the beveled part of cam *l* acts against bearing *m* and moves rod *i* backward, and as the rod *i* is relieved from the action of the cam the spring carries the looper *k* forward and across the line of descent of the needle and distends the loop of needle-thread it has caught for the needle in its next descent to pass through. When rod *i* turns backward cam *l* ceases to bear against bearing *m*, and spring *n*, which was contracted as rod *i* was thrown backward, forces it back to its place. The cam or sleeve *o* at the same time actuates lever *q*, which, turning upon its pivot *r*, throws its opposite end against pin *t* and advances feed-bar *s*. As rod *i* turns backward the cam on sleeve *o* ceases to bear against lever *q*, and its pressure against pin *t* is thereby relieved, and the spring *v* draws the feed-bar back. If an upper feed be used in combination with the sliding and rocking rod *i*, (see Fig. 7,) its action will be this: Cam *x* moves toothed presser-foot *e* back and forth, cam *y*, acting against pin $z^2$, lifts spring *f* while foot *e* is moving backward.

What I claim, and desire to secure by Letters Patent, is—

1. Imparting to the looper-rod the rocking and sliding motions described when the parts for giving these motions are arranged and operated substantially as and for the purposes described.

2. Adjustable sleeve *o*, constructed and operated substantially as and for the purposes set forth.

3. In combination, the rocking and sliding rod *i*, sleeve *o*, cam *u*, and feed-bar *s*, constructed and operating substantially as described.

4. The combination and arrangement of the rotating cam *g* on the driving-shaft with the connecting-rod *h*, rocking shaft *i*, cam *u*, and feed-bar *s*, operating as and for the purposes set forth.

5. The presser-foot *e*, cam *x*, shown in Fig. 7, and sliding and rocking rod *i*, when combined and operating substantially as described.

J. W. BARTLETT.

Witnesses:
S. J. GORDON,
H. E. SOMERVILLE.